United States Patent
Hartman et al.

(10) Patent No.: US 6,810,693 B1
(45) Date of Patent: Nov. 2, 2004

(54) CONTINUOUS IN-LINE SYSTEM FOR PRODUCING HIGH TEMPERATURE GLASS FIBER MATERIALS

(75) Inventors: David R. Hartman, Granville, OH (US); William C. Brady, Granville, OH (US); David V. Stotler, Newark, OH (US); Susan M. Pierik, Shawnee Hills, OH (US)

(73) Assignee: Owens Corning Fiberglas Technology, Inc., Summit, IL (US)

(*) Notice: Subject to any disclaimer, the term of this patent is extended or adjusted under 35 U.S.C. 154(b) by 989 days.

(21) Appl. No.: 09/333,356

(22) Filed: Jun. 15, 1999

Related U.S. Application Data (60) Division of application No. 08/815,379, filed on Mar. 11, 1997, now abandoned, which is a continuation-in-part of application No. 08/736,903, filed on Oct. 26, 1996, now abandoned.

(51) Int. Cl.[7] ............................................. C03B 37/08
(52) U.S. Cl. .............................. 65/495; 65/499; 65/347
(58) Field of Search .......................... 65/495, 499, 347

(56) References Cited

U.S. PATENT DOCUMENTS

| | | | | |
|---|---|---|---|---|
| 3,013,095 A | * | 12/1961 | Russell | 65/347 |
| 3,283,055 A | * | 11/1966 | Trethewy | 65/499 |
| 3,988,135 A | * | 10/1976 | Coggin | 65/499 |
| 4,155,731 A | * | 5/1979 | Byrnes et al. | 65/499 |
| 4,167,403 A | * | 9/1979 | Coggin | 65/499 |
| 4,421,538 A | * | 12/1983 | Demaschquie | 65/499 |

FOREIGN PATENT DOCUMENTS

| | | | | |
|---|---|---|---|---|
| RU | 998399 | * | 2/1983 | 65/495 |

* cited by examiner

Primary Examiner—John Hoffmann
(74) Attorney, Agent, or Firm—Inger H. Eckert; James J. Dottavio; Maria C. Gasaway (57) ABSTRACT

The invention relates to an in-line process for producing high-temperature stable glass. A sizing composition is advantageously used to reduce plasticizing between the resinous matrix and the glass fibers. The in-line process uses a melter or furnace apparatus, including a top charging and melting section and an intermediate flow regulator section having a baffle system improving the heat pattern across the glass flow, and a bushing having a tip plate for receiving molten glass from a furnace. The bushing has an enlarged size that allows drawing of a significantly increased number of glass fibers at one time. The fibers have essentially no catenary and may be wound to create a tightly wrapped package of glass fibers of uniform exterior diameter throughout their width. High-strength, high-silica fiber made according to the invention may be advantageously used in filament-winding, pultrusion and weaving processes.

8 Claims, 9 Drawing Sheets

CONTINUOUS IN-LINE SYSTEM FOR PRODUCING HIGH TEMPERATURE GLASS FIBER MATERIALS

CROSS REFERENCE TO RELATED APPLICATION(S)

This is a division of U.S. patent application Ser. No. 08/815,379, filed Mar. 11, 1997, abandoned which is a continuation-in-part of U.S. patent application Ser. No. 08/736,903, filed Oct. 26, 1996 abandoned.

TECHNICAL FIELD AND INDUSTRIAL APPLICABILITY OF THE INVENTION

The present invention provides an in-line process for the direct production of high-temperature resistant glass fibers. In one embodiment, this new in-line process includes a top-charging electric glass-melting furnace positioned vertically above a bushing plate containing apertures through which fibers are extruded, and an intermediate flow regulating baffle system which improves the heat pattern across the glass flow by redirecting the glass flow to the bushing. In addition, a bushing of enlarged size and heretofore unknown design allows drawing a significantly increased number of glass fibers at one time at high temperatures while minimizing bushing deformation or sag. The invention further relates to a high-strength/high-temperature magnesium aluminosilicate fiber designed for use in filament winding, pultrusion and weaving processes.

The process and apparatus of the present invention are useful in a wide range of applications relating to the production of continuous high-temperature glass fibers, strands and filaments. In particular, the process and apparatus permit the direct production of fiber rovings for use as a reinforcing material in composite structures. Additionally, the glass fibers of the present invention are useful in a diverse range of applications requiring high strength and/or high-temperature stability. For example, glass fibers of the invention are useful in thermal acoustical silencers such as those used with gas engines, diesel generators and jet turbines.

BACKGROUND OF THE INVENTION

Glass fibers are well known and widely used as reinforcing materials in a wide variety of composite structures. While both continuous and staple glass fibers are used as reinforcing media in such structures, continuous glass fibers are generally preferred for applications requiring high-strength materials. For example, continuous glass fibers are often used in military applications, such as in aircraft radar protection domes, rotor blades and armor systems, as well as in commercial pressure vessels and jet components. In these applications, a tow or roving comprised of a multiplicity of individual filaments or fibers are incorporated into the structure. Typically, this collection contains between 1500 and 24,000 individual glass filaments having a diameter of from about 5 microns to 30 microns, depending on the product.

The use of continuous glass fibers in high-temperature environments and to reinforce high-strength composite materials has placed increased demands on the strength and high-temperature stability of the glass fibers. As a result, researchers are constantly looking for glass compositions that provide stronger fibers capable of withstanding higher temperatures without deformation, and for ways to improve the manufacturing process to achieve greater consistency and uniformity among the fibers. Accordingly, a need exists for glass compositions exhibiting higher strength and higher temperature stability than the conventional magnesium aluminosilicate glasses typically used in such applications containing approximately 65% silica ($SiO_2$), 25% alumina ($Al_2O_3$) and 10% magnesia (MgO).

Additionally, a need exists for manufacturing methods that maximize uniformity of the fibers and minimize fiber breakage. Because of the high melting temperature of the magnesium aluminosilicate glasses typically used for such high-strength glass reinforcing fibers, it has heretofore not been feasible to produce such rovings from a single fiber-forming apparatus such as disclosed in U.S. Pat. No. 3,264,076. As a result of the high temperatures necessary to melt such compositions, the conventional bushings through which such compositions are drawn into fibers have been limited in size to those capable of producing from approximately 200 to 1000 fibers of from about 5 microns to 14 microns in diameter. Attempts to use larger bushings with greater numbers of tips or orifices through which the glass is drawn have typically encountered the problem of the bushing sagging or warping as a result of the high temperature and the weight of the larger quantities of molten glass supported by the bushing. Such warpage of the bushing is generally unacceptable for numerous reasons. For example, since the bushings are typically heated via electrical resistance, the bushing must be electrically insulated to operate effectively. Warping of the bushing allows the lower surface of the bushing to contact the heat-dissipating fins located beneath the bushing, voiding the electrical isolation of the bushing and resulting in the occurrence of "cold spots" on the bushing at such points of contact. Additionally, warping of the bushing alters the position of the bushing tips and can result in the fibers contacting one another, causing breakouts and stopping the fiberizing process. Further, warping of the bushing can cause a distortion of the orifices through which the fibers are drawn and result in irregularly shaped fibers having less than optimum properties.

As a result of the inability of conventional processes and equipment to permit the direct formation of a sufficient number of fibers to make a roving from a single bushing, it is conventional practice for the fibers exiting the bushing to be drawn from the bushing into forming strands containing from about 200 to 400 fibers. The fibers of the forming strands receive a coating of a sizing composition containing lubricants, among other things, to minimize abrasion of the fibers during handling. After sizing, the forming strands are individually wound into rolls for storage. Rovings used as reinforcing materials are then made by combining a sufficient number of forming strands to provide a roving having the desired number of fibers. In this operation, the forming strands are unwound from their individual rolls, combined to form the roving, and the roving is then wound onto a roll for shipment to the end users. Unfortunately, the winding and unwinding of the forming strands onto rolls, and the combining of the forming strands into a roving, impart stresses to the strands and introduce a significant amount of fiber breakage, which results in a roving having less than optimal strength characteristics.

Moreover, combining a number of forming strands to make the roving typically results in a roving having undesirable catenary when the roving is unwound for use. Accordingly, a need exists for a fiber-forming apparatus capable of operating at the high temperatures necessary to melt high-strength, high-temperature magnesium aluminosilicate glasses, and of directly forming the number of filaments desired in the final roving. As such, a need exists for a bushing design that is large enough to accommodate the quantity of tips or orifices required to create the desired number of fibers, yet withstand the heat and weight of the molten glass load without warpage or sagging.

These heretofore unmet needs are satisfied by the glass and sizing compositions, and the fiber-forming process and apparatus, of the present invention.

SUMMARY OF THE INVENTION

The present invention provides an in-line process for the direct production of glass fiber rovings formed of more than about 850 substantially continuous high-strength, high-temperature glass fibers comprising: (1) heating a high-temperature glass composition to a temperature sufficient to form a melt; (2) passing the melt through a fiber-forming bushing having a tip plate assembly formed of one or more plates, the tip plate assembly containing a sufficient number of fiber-forming tips to simultaneously form more than about 850 substantially continuous glass fibers; (3) applying a sizing composition to the fibers; and (4) collecting the substantially continuous glass fibers directly into a roving. This in-line process allows for the production of magnesium aluminosilicate glass fibers having improved strength, high-temperature stability, and corrosion resistance. In addition, the in-line process of the present invention reduces devitrification at high temperature, thus reducing fiber variability. The process additionally provides for better fiber alignment in a single-step roving-forming operation, resulting in a reduction in catenary and broken filaments and improved translation of fiber properties to fiber-reinforced composite structures.

In one embodiment of this innovative process, the fibers are formed by melting the glass composition in an electric furnace located vertically above a bushing tip plate assembly through which the fibers are extruded. The bushing tip plate assembly of the invention is designed to reduce tip plate sag at high temperatures while permitting a greater number of fibers to be drawn therefrom than heretofore possible. In another embodiment of the present invention, a flow regulation system is included in the glass flow channel between the furnace and bushing tip plate assembly to provide a more uniform glass temperature distribution across the bushing tip plate assembly, improve the bushing operating efficiency, and allow for a tighter control of filament diameter.

In a preferred embodiment, the bushing for making continuous glass fibers comprises a generally rectangular, elongated tip plate assembly including one or more plates each having a plurality of holes therein, walls extending upwardly from the plate along all sides thereof forming a cavity, ribs projecting into the cavity formed by the walls from two oppositely faced walls in an alternating pattern and projecting substantially perpendicular to the adjoining walls, the ribs being attached to the adjoining wall and to each plate, the bushing being capable of continuous use at temperatures of from 2850° F. to 2950° F. for periods of from 18 to 21 days without experiencing sag in the tip plate assembly greater than about 0.094 inches. The tips are preferably attached to the tip plate at the holes thereof, the tips each having a bore therethrough through which glass passes. The tips may be removably inserted, whereby tips having different diameter bores may be inserted. Preferably, the plurality of holes are from 1,500 to 2000 in number. Each bore preferably has a diameter of from about 1200 microns to about 1500 microns, more preferably of from about 1300 microns to about 1400 microns. Preferably, the holes are distributed uniformly through the longitudinal area of the tip plate assembly, and are aligned in rows traversing the width of the tip plate assembly. The holes may further be arranged in double rows between adjacent ribs, with the holes in each of the double rows being out of alignment with the lengthwise axis of the tip plate assembly. The tip plate assembly preferably has a width of from about 2.5 inches to about 4.5 inches, and a length of from about 17 inches to about 21 inches. The ribs preferably span from 50 to 100 percent of the width of said tip plate assembly, with each rib having a width that diminishes along the length of the rib away from the adjacent wall to which it is attached. Preferably, the ribs span the entire width of the tip plate assembly and are attached to the assembly and both of the oppositely facing walls. Preferably, each rib has a width that diminishes to a minimum along the length of the rib away from one of the oppositely facing walls to which it is attached and therefrom increases along the length of the rib to the other opposing wall to which it is attached.

In addition, the process of the invention further includes the coating of the glass fibers with a sizing composition not heretofore used in the manufacture of high-strength, high-temperature glass fibers. This composition preferably comprises a dual-silane system designed to increase the thermal hydrolytic stability of the fibers by reducing the diffusion of moisture and ionic activity leading to corrosion.

The above and other objects and advantages of the invention will become apparent from the detailed description below in conjunction with the appended drawing figures.

DETAILED DESCRIPTION AND PREFERRED EMBODIMENTS OF THE INVENTION

The present invention provides an in-line process and apparatus for the direct production of rovings formed of a multiplicity of substantially continuous, high-temperature glass fibers. As used herein, "high-temperature" glass fibers are fibers having softening points at temperatures greater than about 1050° C. (1922° F.). In particular, the process of the invention provides for the direct formation of rovings containing more than about 850 individual fibers having diameters of from about 5 to about 30 microns. Preferably, the process provides for the direct formation of rovings containing about 1,000–4,000 individual fibers having diameters of from about 9 microns to about 26 microns. More preferably, the roving contains about 1,500–2,000 fibers having diameters of from about 9 microns to about 26 microns. Rovings containing about 1,800–1,900 fibers having diameters of from 10 to 15 microns are most preferred.

The preferred high-temperature glass fibers are magnesium aluminosilicate glass fibers formed from a glass composition comprising from about 70 percent to about 85 percent by weight silica ($SiO_2$), from about 15 percent to about 25 percent by weight alumina ($Al_2O_3$), and from about 0 percent to about 12 percent by weight magnesia (MgO). Preferably the fibers comprise from about 70 percent to about 72 percent silica, from about 18 percent to about 25 percent alumina, and from about 4 percent to about 12 percent magnesia, more preferably, about 70 percent silica, 20 percent alumina, and 10 percent magnesia (unless indicated otherwise, all percentages herein are by weight). In some applications, compositions comprising 75 to 85 percent silica and 15 to 25 percent alumina, preferably 80 to 85 percent silica and 15 to 20 percent alumina, may be especially useful. Additionally, the fibers may contain zirconia or titania to enhance their alkali resistance. Preferably, the fibers contain zirconia in an amount of from 0 to 15 percent by weight, or titania in an amount of from about 0 to 10 percent by weight.

The preferred glass compositions for use in the invention have higher silica and lower alumina contents than S-2 Glass® (65% silica, 25% alumina and 10% magnesia), which provides the fibers with improved durability in acidic environments and increased tensile strength. Moreover, the preferred glass compositions melt at higher temperatures than standard S-2 Glass compositions and provide a larger forming temperature range before devitrification is known to begin to occur. Accordingly, such compositions are ideally suited for the large bushings required to simultaneously make the desired number of filaments according to the process of the invention. The larger forming temperature range of such compositions provides greater latitude in controlling the glass temperature within the melter and across the bushing plate, and permits the use of such bushings without the glass being held within the melter for too long in its critical temperature range, or cooling too slowly at or through the bushing tip, to avoid devitrification.

In the process of the invention, the high-temperature glass composition is heated to a temperature of about 1593° C. (2900° F.) to form a melt having a viscosity of from about 630 poise to about 1000 poise. Heating is accomplished in a walled melting receptacle having an open region into which material to be melted is charged to the receptacle, a melting region in which the material is melted, means in the melting region to melt the charged material, and a discharge region from which molten material is discharged. Any furnace capable of rendering the glass composition to such a molten state may be used in the process of the invention. However, a glass-melting electric furnace disposed vertically above a bushing tip plate assembly containing orifices or nozzles through which fibers are extruded, as described in U.S. Pat. No. 3,264,076, the disclosure of which is incorporated herein by reference, is particularly preferred. Preferably, such electric furnace includes a means to measure and control the temperature of the melt within the furnace. A particularly preferred control means comprises a bubble generator having an exit opening located within the melt below the melt's upper surface. The bubble generator is connected to a differential-pressure cell which detects any change in the pressure required to force the bubble to exit the bubble generator and enter the molten glass. As the pressure required to force an air bubble into the glass melt changes, a signal is sent from the differential-pressure cell to the batch feeder, which controls the rate at which unmelted raw materials are fed into the unit to obtain a substantially constant glass level in the melter.

In terms of system controls, it is advisable to determine the yardage desired for the final product before beginning the process. Yardage depends on a number of interrelated operating parameters. Specifically, yardage (yd./lb.) is indirectly proportional to the bushing throughput, Q. That is, as Q increases, the yardage decreases (assuming constant winder speed) because the filament diameter increases. This may be expressed by yd./lb. =k/Q, where k is a constant related to the winder rpm×circumference×time. Q is the governing factor and is defined as:

$$Q = \frac{\text{head} \times \text{density}^2 \times \text{hole diameter}^4}{\mu \times \text{tip length}} \text{ (where } \mu \text{ is viscosity).}$$

For any one system (same bushing and glass composition) the density, hole diameter, and tip length are constants. Thus, Q reduces to the equation head/$\mu$×k.

The head is simply the height of glass over the bushing. As the head changes, the throughput (Q), and thus yardage, will change in direct ratio.

The head is determined by the ratio of batch input to glass output. If the input increases, the head and, therefore, the output changes until the point is reached where the two are equal (assuming increase in input was incremental and then constant). However, the increased head makes two changes in the operation. First, it changes the throughput and thus the yardage, but secondly, it also changes (increases) the temperature of the melter glass. This occurs because the batch acts like an insulating blanket, holding the heat within the melter. Thus, when the batch thickness increases (as it must to increase the head) the glass temperature increases. This hotter glass then flows to the bushing, where it proceeds to change the bushing throughput and heat pattern. As the hotter glass passes by the control thermocouple, the thermocouple signal to the controller changes and the controller decreases the amount of power to the bushing. This results in colder bushing ends which pass less glass. In some instances, the colder end sections of the bushing may be enough (or more) to compensate for the increased head. In any case, a fluctuation in batch/glass level sets off a chain reaction within the melting unit.

Minor cyclic variations of short duration appear to have little effect on the throughput or the operation due to the time and thermal lag between melting and forming. Large changes made gradually may not create a problem if they are recognized and compensating action taken during the change. It is the sudden abrupt changes that cause problems.

The operating principle of these melters is based on a stable balance of batch input to glass output at a constant power input. Experience has shown that approximately 1.25 kW (kilowatt) is needed for every pound of glass produced. Once batch input, power input, and glass output have stabilized, the temperature in the melter remains remarkably constant also.

A unit may be stabilized by filling the liner with molten glass to a predetermined level using a power input slightly below that expected in normal operation. When the molten glass/batch pool is near the pre-set level, the bushing temperature is increased to start glass draining from the bushing. The bushing temperature is continually increased until the approximate bushing operating temperature for that glass composition has been reached.

Once this temperature has been reached and glass is flowing evenly from the bushing, the batch feed rate is adjusted to hold a constant level. This may require several small adjustments with time in order to obtain the desired rate. Power to the unit is then adjusted, if necessary, to give a constant pool of glass under the batch cover. Care must be taken here, as too often attention is given to holding a constant level of batch with no regard as to the glass level beneath it. The batch cover should not exceed approximately ½ to ¾ inch in depth. Anything 1 inch or more is too much and an indication that either the bushing is pulling too much glass or not enough power is being supplied to the unit to melt the batch.

It is useful to get some kind of pull check within a short period of time after starting to pull glass. This check can employ pulling by hand, in a pull wheel or winder, but it should be obtained as soon as feasible. If the pull check indicates the desired throughput, then more power must be used to melt a heavy batch. If the pull check is too high, then the bushing temperature can be reduced. Sometimes it is necessary to do both in order to stabilize the unit. Once a unit has started to level out (stabilize), change should be made gradually unless an emergency situation (e.g., bushing flooding, no glass in melter, no batch in feeder) arises.

Figure 1:
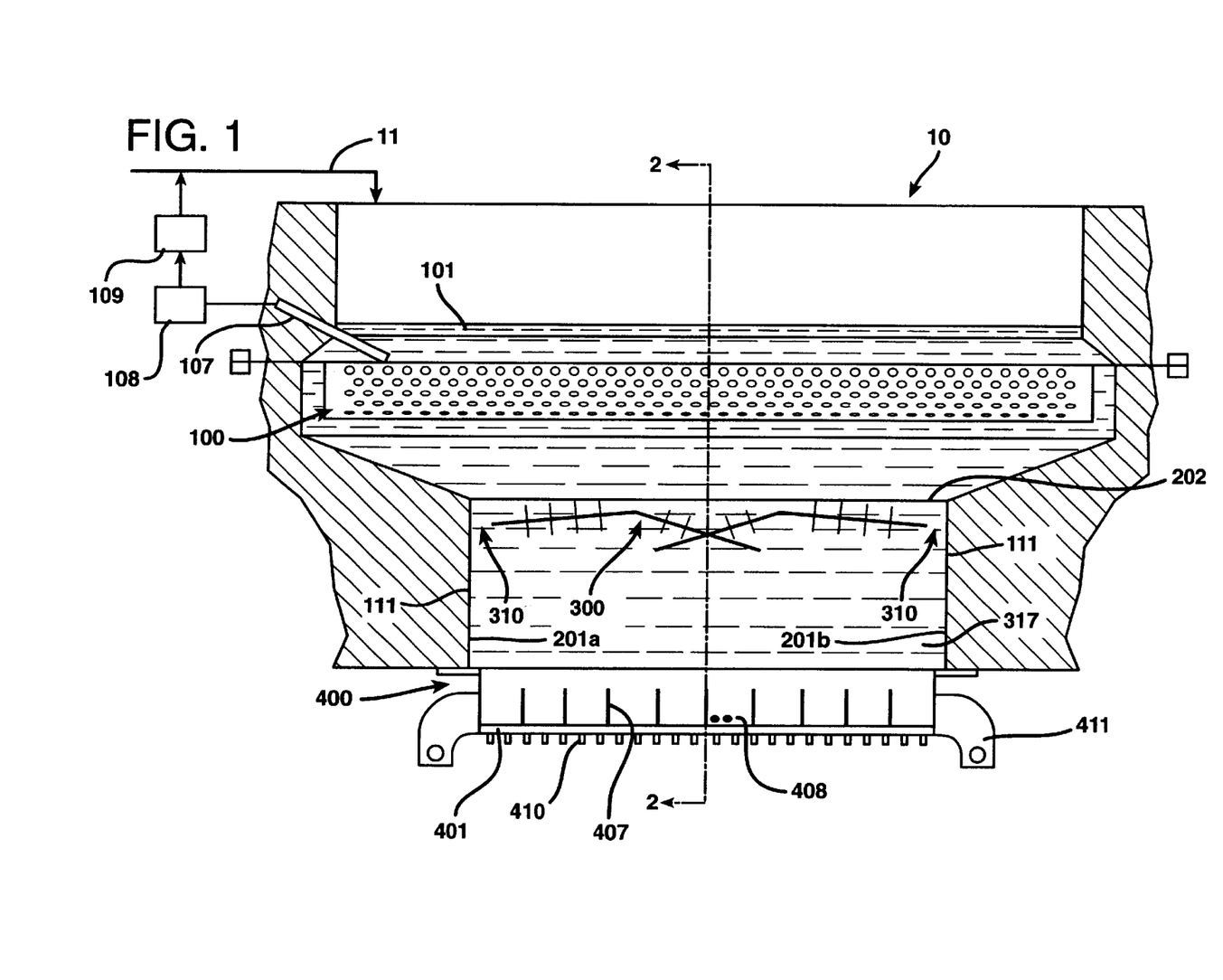
FIG. 1 is a sectional view of the melting receptacle of the invention.

In a preferred embodiment of the invention, a batch 101 of glass or other high-temperature melting/fusing material is charged into the open region 20 of a walled melting receptacle or furnace 10 and is melted via one or more heating elements 100. System control is obtained through means including a bubble generator 107. The bubble generator 107 can be any known apparatus for generating an air bubble in a viscous liquid that can withstand exposure to the temperature of the molten glass and that can be connected to a differential-pressure cell 108 to measure changes in the pressure required to emit a bubble into the liquid, which is connected to a feed controller 109 that regulates the feed rate of the batch material 11 in response to the signal from cell 108. Preferably, the exit opening of the bubble generator is located such that the bubbles rise through the molten glass and escape, and do not accumulate on the surface of any of the heating elements 100 contained in the furnace nor become entrained in the molten glass flowing to the bushing assembly 400.

Figure 2:
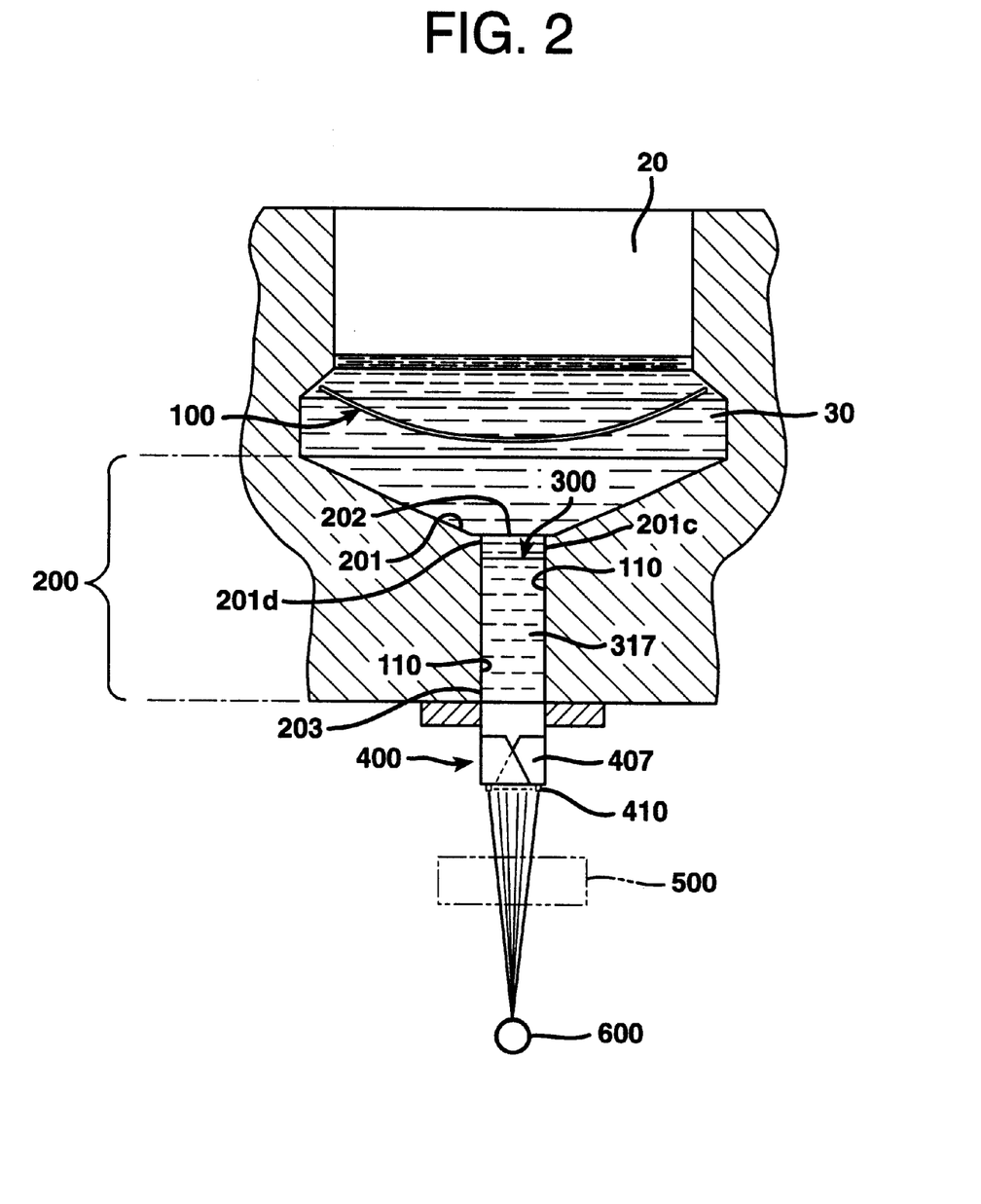
FIG. 2 is a transverse sectional view taken along line 2—2 of FIG. 1.

In a preferred embodiment of the invention, the bushing 400 is disposed vertically below the glass-melting furnace, with a flow-regulating system 200 for regulating the flow of the molten glass to the bushing disposed therebetween, as shown in FIGS. 1 and 2. The glass-flow regulator system 200 comprises a baffle plate system or unit 300, which serves to mix the glass as it flows through the furnace, thus controlling the length of time required for the glass to traverse the furnace from charging to discharging as glass fibers. In a preferred embodiment, the system 200 comprises a narrowing area between the furnace melting region and the bushing such that the glass flows into a funnel-shaped liner or chute 201, with the baffle plate system 300 positioned near its bottom 202. The upper portion of the chute 201 is open and in flow communication with the melting region 30 of the furnace 10. The baffle plate system, which has two plates 301 and 302, conforms to the shape of the chute and is positioned such that it abuts only two oppositely facing walls 201c, 201d of lower portion of the chute, which forms discharge region 203 of the furnace. The gap 310 between the baffle plate system and the non-abutting walls 201a, 201b of the chute provides an area of least resistance to the glass melt, channeling hotter glass from inside to the colder outer edges. Preferably, the chute is generally rectangular in cross-section and the baffle plate is generally rectangular in shape when viewed from above. The baffle plate also has two sets of holes 303 and 304 of different diameters so as to allow the glass to flow through the holes down through the baffle plate towards the bushing. Specifically, the plate has a series of holes 304 which allow the glass to flow directly through. Located between these holes 304 and the end gaps 310 are smaller holes 303 that allow any air to escape the melt prior to entry into the bushing. Preferably the holes 303, 304 in the baffle plate each have a diameter of from about 1 mm to about 12 mm, with the diameter of holes 303 being smaller than the diameter of holes 304.

The material lining the interior of the furnace, including the melting region, as well as the material used to form components of the flow regulator system, including the baffle plates, may be any material known in the art that is capable of withstanding the high temperatures required to melt and fuse or form fibers from the high-temperature glass compositions of the invention. Suitable materials include precious-metal alloys comprising approximately 90% platinum and 10% rhodium by weight.

Figure 3A:
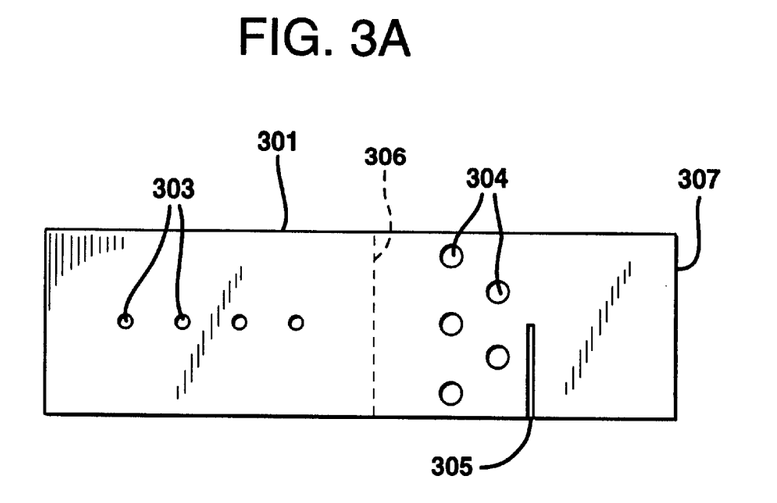
FIG. 3A is a top view of a baffle plate.
Figure 3B:
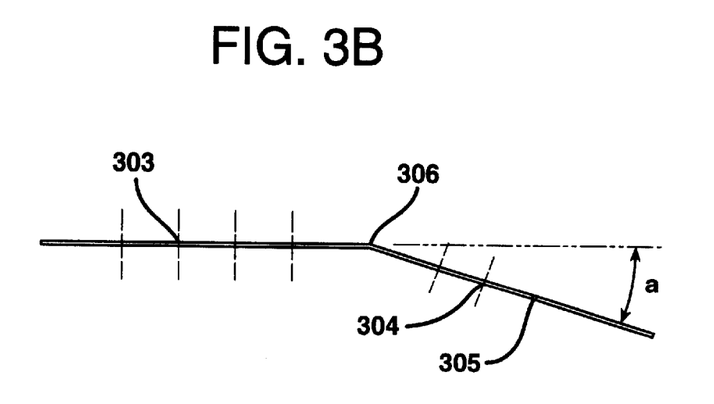
FIG. 3B is a front view of a baffle plate, after bending.
Figure 3C:
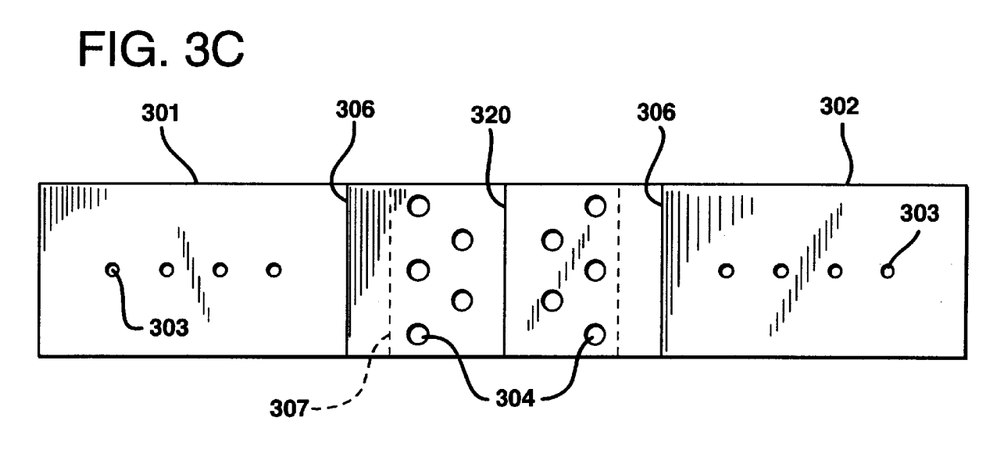
FIG. 3C is a top view of the assembled baffle.
Figure 3D:
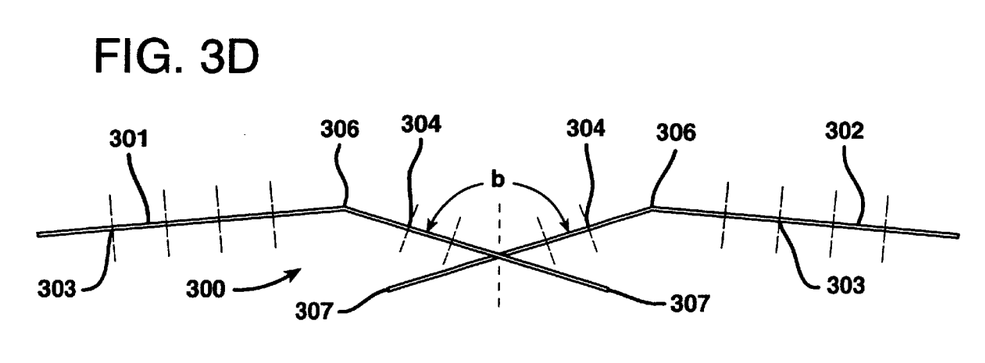
FIG. 3D is a front view of the assembled baffle.

The baffle plate system or unit 300 comprises two plates 301 and 302, each of which is pre-drilled with holes 303, 304 and includes a slot 305 (only one shown for plate 301) that runs part-way across the width of the plate parallel to the non-abutting chute walls 201a, 201b so the slots of the two different plates can be mated to join the plates 301, 302 and form one complete unit 300. The baffle plates are preferably bent along an axis 306 parallel to the non-abutting walls of the chute between the location where the plates are joined and their respective ends farthest away from the joint 320 to form an obtuse angle (180 minus "a") of from about 145 to 165 degrees (see FIG. 3B). Preferably angle "a" is about 19 degrees and the obtuse angle formed in the baffle plate is about 161 degrees. The baffle plates are assembled (FIGS. 3C and 3D) such that the angle between the joined sections of the plates "b" (FIG. 3D) is from about 143 to about 173 degrees, preferably about 159 degrees. After assembly (see FIGS. 3C and 3D), the baffle plate system is preferably mounted in the lower section 203 of the chute such that the ends 307 of each plate are lower than the bend axis 306. Consequently, glass flowing downward through the furnace will not only flow through gaps 310, it will also flow through the plate holes 304, after which it will continue its downward flow around the plate ends 307. The baffle system of the present invention provides a significant improvement in heat-pattern regulation across the bushing. Previous horizontal flow regulators resulted in heat patterns containing temperature differentials of approximately 66.7° C. (120° F.) across the glass flow, whereas the present invention reduces this to differences of approximately 11.1° C. to 16.7° C. (20 to 30° F.).

Figure 4:
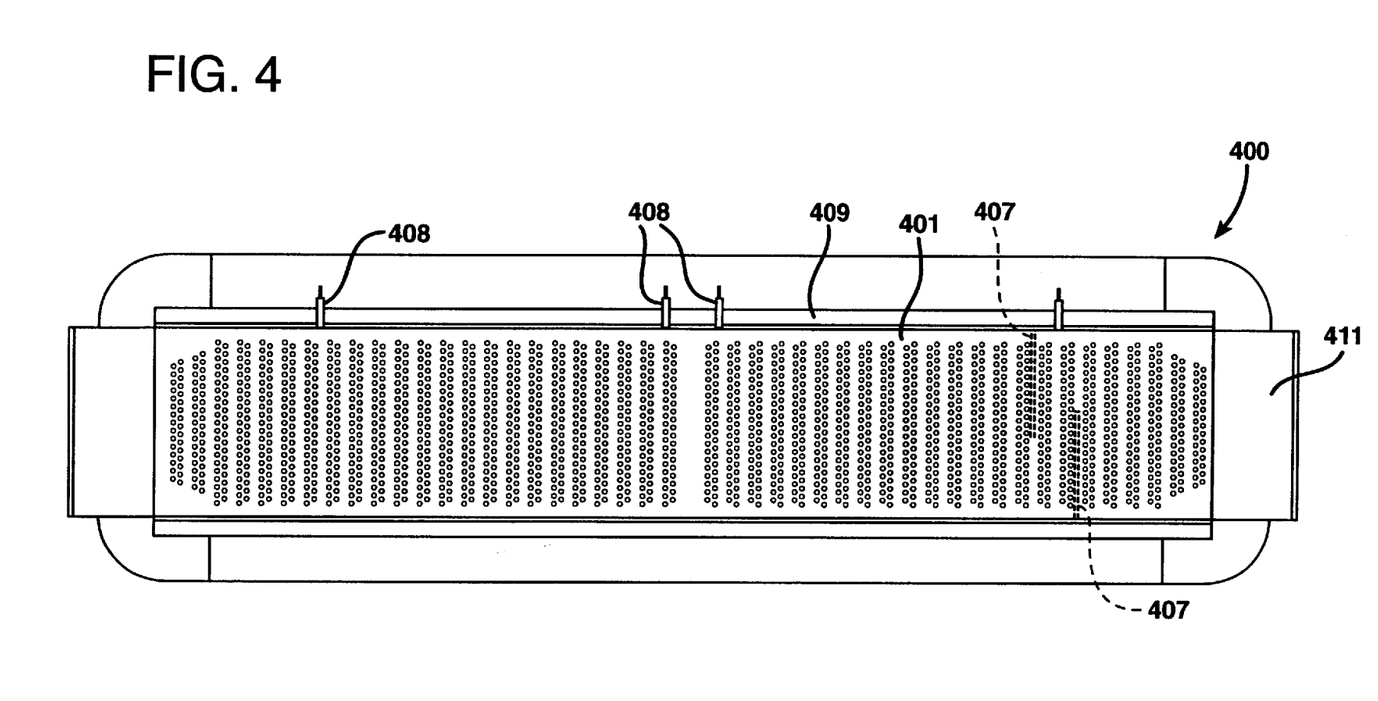
FIG. 4 is a top view of the bushing showing the tip plate assembly.
Figure 5:
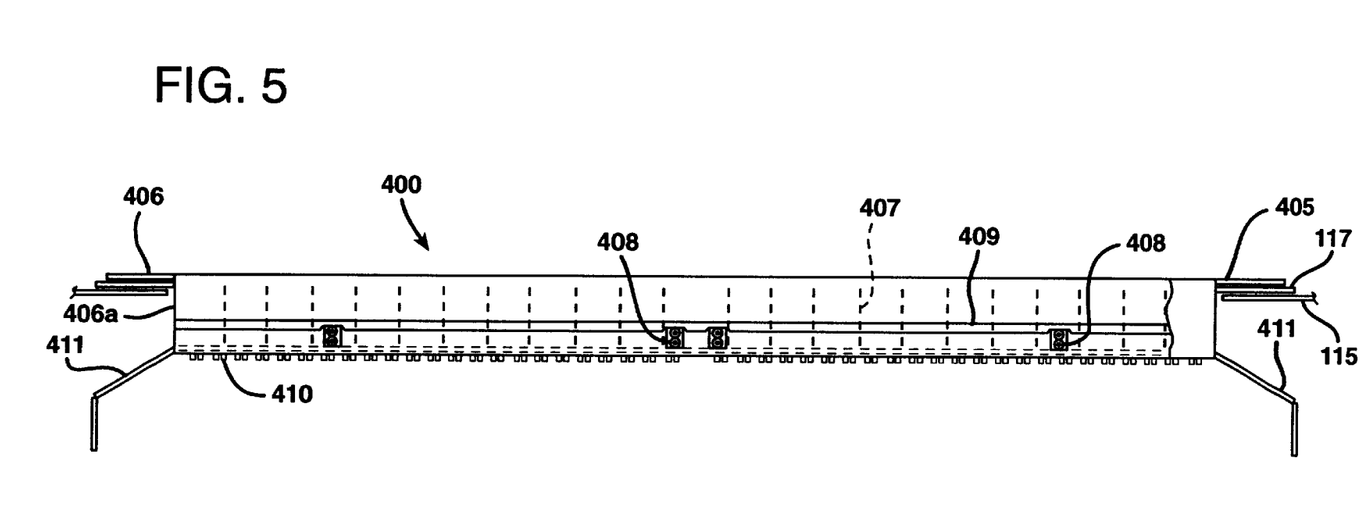
FIG. 5 is a side view of the bushing.

The bushing 400 of the invention comprises a tip plate assembly formed of at least one tip plate 401 having a sufficient number of tips 410 to form the required number of glass fibers. Generally, the tip plate 401 is rectangular in shape, having a width of from about 2.5 inches to about 4.5 inches (6.4–11.4 cm) and a length of from about 17 inches to about 21 inches (43.2–53.3 cm). The tip plate assembly is provided with a support system including side rails 409 and ribs 407 that substantially eliminate sagging during use. Also, the tip plate 401 is preferably concave in width to further aid in eliminating deformation of the plate caused by heating and the large head of the furnace.

In contrast with this invention, previous bushing plates for producing high-temperature, high-modulus glass were limited by strength requirements to containing no more than approximately 800 tips. Consequently, the formation of rovings containing more than 800 filaments required combining fibers from different furnaces and bushings or from different lots from the same furnace and bushing. This resulted in a process where pulled filaments were grouped into strands of approximately 200 filaments. The resulting strands were then further combined with other strands and pulled into a final roving. This process required numerous adjustments in tension when pulling the filaments and strands, and virtually always resulted in a roving exhibiting undesirable catenary.

In the process of the invention, the molten glass composition 101 discharged from the discharge region 203 of the melting receptacle is fed to a fiber-forming bushing 400 comprising a tip plate 401 with a sufficient number of tips 410 inserted therein to simultaneously form the number of glass fibers desired in the resulting roving or strand. Preferably, the plate contains from about 1000 to about 4000 tips having an inside diameter of from 1200 to 1500 microns, more preferably about 1500 to 2000 tips having an inside diameter of from 1200 to 1500 microns. A plate containing about 1800 to 1900 tips having an inside diameter of 1300 to 1400 microns is most preferable. The tips 410 each preferably include an upper flange portion and a cylindrical lower portion extending downwardly therefrom, with the lower portion having an outer diameter smaller than the borehole diameter in the tip plate and the flange portion having an outer diameter larger than the borehole diameter, so that the tips may be removably inserted into the tip plate by inserting the lower portions through the boreholes with the flange portions resting on the top of the tip plate.

Not only does the bushing of the present invention eliminate catenary in the resulting roving, but it eliminates the bottleneck in the old roving process, thus speeding the overall production. The plate of the present invention additionally allows for the maintenance of properties, specifically strength, with filament diameters as high as 30 microns. This is significant since fine filaments are more prone to catenary and heavier filaments are more prone to breakage in secondary processes.

The bushing 400 is mounted beneath the glass flow channel 317 defined by side walls 110 and end walls 111. The bushing includes the floor or tip plate 401, upperly extending side walls 403a, 404a and end walls 405a, 406a. The side walls and end walls terminate in laterally extending flanges 403–406. The side flanges 403, 404 and end flanges 405, 406 of the bushing are insulated from bottom flanges 115 of the furnace liner by high-temperature resistant insulation or insulators 117. A standard refractory setup is used around the furnace liner. Preferably, a castable ceramic such as HW33, commercially available from Harberson and Walker, is used to mount the tip plate and provide insulation from heat loss. The tip plate of the feeder or bushing is provided with the orifice tips or projections 410 through which molten glass is discharged in the form of fibers or filaments. The bushing tip plate and tips can be formed of any material known in the art that can withstand the temperatures involved. For example, the tip plate 401 can be formed from a precious-metal alloy containing about 75% platinum and about 25% rhodium, and the tips 410 can be formed from an alloy containing about 72% platinum and about 28% rhodium.

Figure 6:
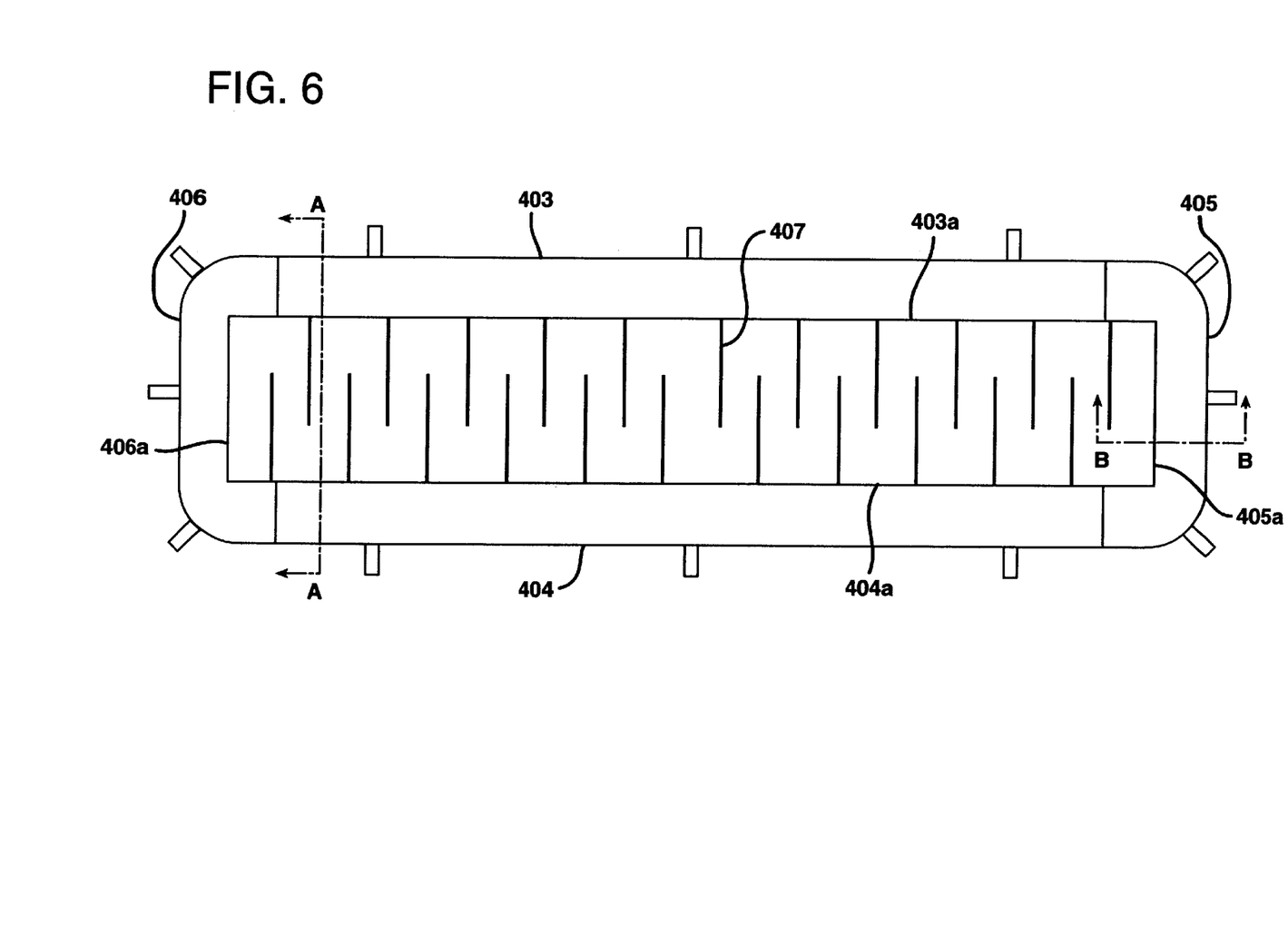
FIG. 6 is a top view of the bushing showing the placement of the ribs.
Figure 6A:
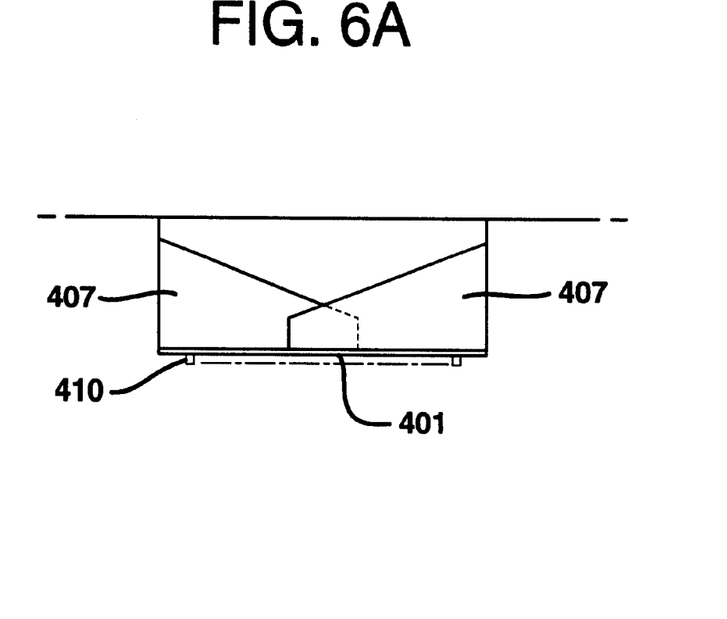
FIG. 6A is a sectional view taken along line A—A of FIG. 6.
Figure 6B:
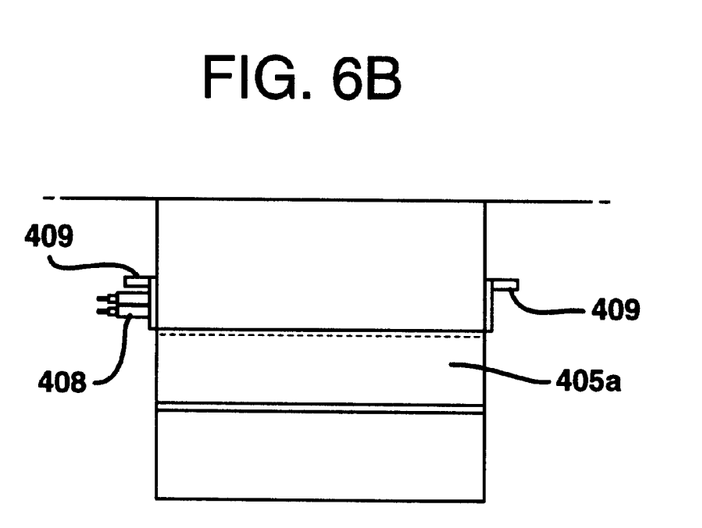
FIG. 6B is a sectional view taken along line B—B of FIG. 6.
Figure 7:
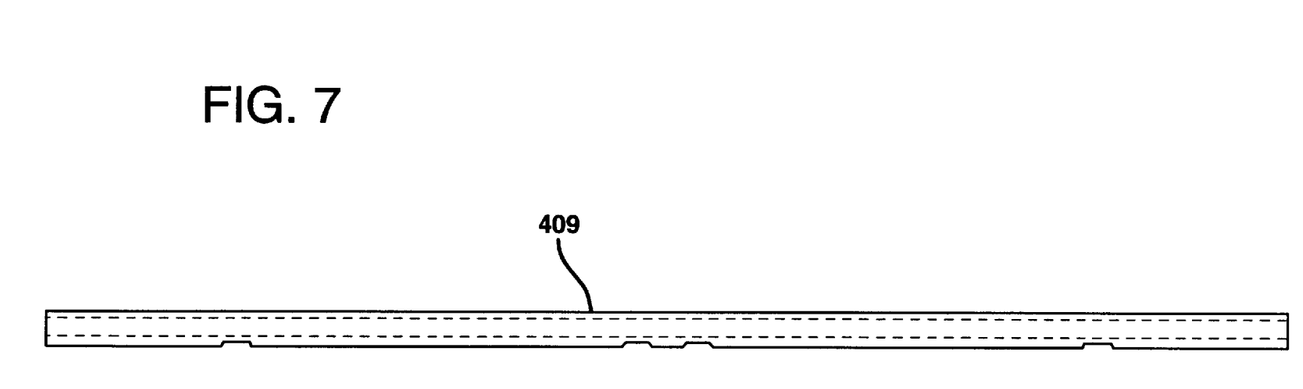
FIG. 7 is a view of the support rail.

Because of the use of precious metals, it is important to design the plate assembly so as to minimize creep or sag. Braces or ribs 407 extend substantially perpendicular from the side walls 403a, 404a at least part-way across the narrow width of the tip plate and are attached to the top of the tip plate and to the side walls. These ribs 407 serve as strengthening and stiffening members and prevent sagging of the tip plate. The ribs span from about 50 to 100 percent of the width of the tip plate (i.e., the length of each rib is 50–100% the width of the tip plate). When the ribs span less than the entire width, it is preferred that the ribs span from about 50 to 95 percent of the tip plate width. Additionally, when the ribs span less than the entire width of the tip plate, adjacent ribs are attached to opposite side walls as shown in FIG. 6. Moreover, it is preferred that the height of the ribs decrease along the length of the rib from the adjacent side wall to which it is attached to its other end away from the wall as shown in FIG. 6A. This allows for some glass flow across the plate and prevents the molten glass in the bushing from becoming completely compartmentalized. When the ribs extend across the entire width of the tip plate assembly, the height of each rib preferably diminishes to a minimum along the length of the rib away from one of the oppositely facing side walls to which it is attached, and then increases along the length of the rib from that point to the other of the oppositely facing side walls to which it is attached. Accordingly, the upper edge of the rib is roughly in the shape of a V when viewed from the end of the, tip plate assembly. Furthermore, for tip plates having about 2000 to 4000 tips, the plate may be stiffened further to avoid creep or sag by attaching a second perforated plate to the tops of the ribs parallel to the tip plate, thereby sandwiching the ribs between the plates and forming a double bottom bushing.

The boreholes in the tip plate may be arranged in any suitable manner. Preferably, the boreholes are arranged in rows that traverse the width of the tip plate assembly. In such configurations, the ribs are preferably disposed between one or more rows of boreholes. More preferably, the boreholes are arranged in double rows such that the holes in each pair of rows are out of alignment with the lengthwise axis of the tip plate, and a rib is disposed between each pair of rows of boreholes.

Furthermore, because of the high weight of the glass melt on top of the tip plate, it is preferred that the tip plate be slightly concave across its width such that the middle of the tip plate is slightly higher than either side. Longitudinally, the tip plate may also have a slight arch if desired. This total support arrangement has resulted in use for as long as 26–33 user days at temperatures of from about 1565.6° C. to 1621.1° C. (2850° F. to 2950° F.). This is a significant improvement over conventional high-temperature bushing plates. Preferably, the bushings of the invention are capable of continuous use at these temperatures for periods of from 18 to 21 days without experiencing a sag in the tip plate assembly of more than 2.39 mm (0.094 inch).

The end walls of the tip plate or bushing are respectively provided with terminals or ears 411 for connection, e.g., via a conductive clamp, to an electrical energy source (not shown). Thermocouples 408 are preferably provided to monitor the temperature of the glass melt. If the thermocouples detect too low of a temperature, they signal a control device (not shown) to supply power to the terminals 411. This allows current to be driven through the tip plate 401, maintaining it in a heated condition so as to aid in control of the flow of glass through the tips. Preferably, the glass melter is equipped with watts transducers to help control the power delivered to the melter at a constant level notwithstanding fluctuations in voltage from the electrical energy source.

In a preferred process of the invention, the glass filaments are pulled and attenuated, and sizing is applied, using conventional techniques. After the sizing is applied, e.g., using a conventional applicator 500, the resulting fibers are collected into a roving, which is then wound into a package, e.g., using a conventional winder 600. The present invention preferably employs a winder that comprises a builder carriage which moves from side to side of a spinning collet roll, guiding the roving strand while applying pressure to the already rolled strand so as to create a square package. In particular, the winder preferably applies pressure such that the accumulated roving strand is in a square package, wherein the package is of a substantially consistent thickness or build over the distance of the roll.

Preferably, the invention further encompasses application of a sizing composition particularly suited for the high-temperature glass fibers of the invention. Applying size to glass fibers may be done for several purposes. Both before and after drying, the sizing composition protects the glass fibers from being weakened as a result of abrasion during processing. The sizing composition can also serve to help integrate the individual fibers of a multi-fiber strand into a more or less coherent unit. The dried size not only protects the fibers from abrasion while integrating multi-filament strands, but it also facilitates the wetting of the coated fibers by a liquid material which will cure or set to form a solid resinous matrix in which the fibers are embedded as reinforcing elements, and thereby enhances the coupling between the cured resinous matrix and the glass fibers so as to produce a more effectively reinforced composite material.

The sizing compositions of the present invention preferably are water-based and comprise one or more silanes, lubricants, film-formers, and, optionally, surfactants. Preferred silanes of the present invention are 3-aminopropyltriethoxysilane and bis-3-trimethoxysilylpropyl amine, commercially available from OSI of Witco under the trade designations A-1100 and A-1170, respectively. The amount of A-1100 may be approximately 75–90% by weight of the total amount of the silanes, whereas A-1170 may be used in an amount of about 10–25% by weight. Preferably, the A-1100 makes up 90% of the total silanes and the A-1170 10% of the total silanes.

The preferred dual-silane size composition provides increased thermal hydrolytic stability to composites made from such fibers. Although the exact mechanism by which this occurs is not completely understood, it is believed that the dual-silane network reduces the diffusion of moisture and ionic activity which leads to corrosion. Since the overall free energy of hydration of the glass fiber surface is the sum of individual silicate and oxide component end members on the surface, or its ionic field strength, it is dependent on the concentration and energy of bonds present in the exposed surface area. Reduction of hydrogen bonding or free surface oxides or silicates, and/or free moisture leading to ionic activity, is improved with the use of both 3-aminopropyltriethoxysilane and bis-3-trimethoxysilylpropylamine through covalent bonding. The bis-aminosilane has six reactive sites and competes better than the aminosilane to further reduce the number of the weaker OH active sites by bonding with highly strained Si—O-Si bonds (silicate) on the fiber surface. The resulting tight network prevents additional reaction with weaker OH groups. The aminosilane is also available at the glass surface to replenish covalent bonds as stress corrosion occurs from new SiOH sites from flaws. Moreover, the secondary amine of the bis-aminosilane helps stability during absorption on the glass surface.

Any suitable lubricant may be used in the sizing composition, such as water-soluble ethylene glycol stearates. Preferred lubricants include polyethylene glycol monostearate (e.g., PEG 400 MS, where 400 represents the molecular weight $M_w$), polyethylene glycol monooleate (e.g., PEG 400 MO), and butoxyethylstearate (BES), with polyethylene glycol monooleate being most preferred. Preferably, the lubricant is present in the sizing composition in an amount of from about 0.5% to about 2.5% by weight.

Any suitable film-former may be used in the sizing composition of the invention. However, epoxy-cresol-novolac film-formers, such as those commercially available as aqueous dispersions from Shell under the trade designation EPIREZ 6006W70, are particularly preferred. Such film-formers are essentially self-emulsifying through the cresol and require minimal nonionic surfactants to maintain a stable solution. The average particle size of the epoxy-cresol-novolac film-former is preferably less than about 1.2 microns, which allows good abrasion resistance in the forming environment and coalesces to a clear film above 60° C. Preferably, the film former is present in the sizing composition in an amount of from about 2% to about 8% by weight.

Depending on the type of lubricant included in the sizing composition, the inclusion of a surfactant may also be advantageous. For example, although surfactants are not necessary when polyethylene glycol monooleate is included in the composition, when other lubricants are selected, inclusion of a small amount of a nonionic surfactant is generally preferred. In particular, an alkylphenol-hydroxypolyoxyethylene surfactant, such as that commercially available from Union Carbide under the trade designation Triton X-100, has been found to provide benefits and is generally preferred. Preferably, the surfactant is present in the sizing composition in an amount of from 0% to 0.25% by weight. Reducing the amount of surfactants present in the sizing composition advantageously reduces the VOCs (volatile organic compounds) released into the forming environment. Moreover, minimal surfactant on the glass surface reduces moisture uptake and potential swelling, which results in strains at the composite interface, and thus improves hydrolytic stability.

Additionally, small amounts of weak acids, such as acetic acid, may be added to the sizing composition to adjust the pH of the composition to about 5 to 9. Such acids generally hydrolyze the silanes during mixing and, as a fugitive organic acid, provide weak ions to help dissolve inorganic acids or bases on the glass surface. Preferably, such acids are present in the composition in an amount from about 0.01% to 0.6% by weight, and the pH of the composition is about 8.

EXAMPLES

Preferred sizing compositions (Sizes 2AA, 3AA, 4AA) are set forth in Table 1. Optionally, PEG 400 MO may be substituted for the BES. Data for an especially preferred size formulation corresponding to Size 4AA are given in Table 2. Properties of this preferred size composition are set forth in Table 3. These size compositions advantageously contain low concentrations of VOCs, exhibit good thermal hydrolytic stability, and form a film that is tough and not tacky, with enough strand cohesion to process in weaving but easily break up for superior wetting during the manufacture of composite articles. Moreover, these compositions exhibit good compatibility with epoxy, phenolic, vinylester, cyanate ester, and bismaleimide thermoset resin systems typically used in advanced composite applications.

Glass fibers sized with Sizes 2AA, 3AA, and 4AA were prepared in accordance with the invention. Properties of strands made according to the invention from fibers sized with preferred sizing compositions and impregnated with an epoxy resin (Runs 2AA*, 3AA*, and 4AA*) or embedded in an epoxy laminate (Runs 2AA, 3AA, and 4AA**) are set forth in Table 4 (normalized to fiber and laminate cross-section, respectively). In particular, the data in Table 4 exhibit the improved strength and modulus retention of glass fibers of the invention in high-humidity and high-temperature environments in comparison to standard S-2 Glass fibers sized with a conventional sizing (1CC or 2CC; see Table 6) as the controls.

In addition, typical strand properties for glass fibers of the invention sized with Size 4AA (size having a formulation as shown in Table 2 was applied in an amount of 0.55±0.1 weight percent solids on the strand) in comparison with those for S-2 Glass fibers sized with conventional Sizes 1CC and 2CC are shown in Table 5. The compositions of the conventional sizings of the S-2 Glass fibers are set forth in Table 6.

TABLE 1

| Material | Compositions | | |
|---|---|---|---|
| | Size 2AA % by weight | Size 3AA % by weight | Size 4AA % by weight |
| A-1100 (silane) | 0.00 | 0.80 | 0.93 |
| A-1170 (silane) | 1.00 | 0.20 | 0.10 |
| EPIREZ 6006-W70 | 4.84 | 4.84 | 4.84 |
| BES | 1.17 | 1.17 | 1.17 |
| Glacial Acetic Acid | 0.20 | 0.20 | 0.20 |
| Triton X-100 | 0.12 | 0.12 | 0.12 |
| DM Water | balance | balance | balance |

TABLE 2

Size 4AA

| Material | % Active Solids[1] | % by weight as received | Lb./100 gallons as received | kg/100 liters as received | Weight Tolerance |
|---|---|---|---|---|---|
| A-1100 | 100.000 | 0.930 | 7.747 | 0.930 | ±5% |
| A-1170 | 100.000 | 0.103 | 0.858 | 0.103 | ±5% |
| 6006-W70 | 70.000 | 4.84 | 40.366 | 4.840 | ±5% |
| BES | 100.000 | 1.174 | 9.779 | 1.174 | ±5% |
| Triton X-100 | 100.000 | 0.116 | 0.981 | 0.116 | ±5% |
| Acetic Acid | 100.000 | 0.20 | 0.170 | 0.020 | |
| DM Water[2] | 0.000 | REF | 773.099 | REF | ±5% |

[1]Original size formulation was based on these % active solids, which converts to 5.5% mixed solids.
[2]DM Water = demineralized water.

TABLE 3

Final Mixed Size Properties

| Property | Minimum | Average | Maximum | Test Method | Special Conditions |
|---|---|---|---|---|---|
| Mix Solids, %* | NA | 5.5 | NA | S-05-5 | ** |
| pH | 8.5 | 9.2 | 10.0 | P-04-3 | NA |
| Storage Temp. | 55° F. | 65° F. | 75° F. | NA | NA |
| Shelf Life | NA | NA | 72 hrs. | NA | NA |

*Mix solids may be varied to maintain control of strand solids within specification limits.
**One hour minimum at 105° to 110° C. (221° to 230° F.).

TABLE 4

| Sample Description | Effective Glass X-Sec. Area (Sq. in.) | Rm. Temp Dry, As Received | | | |
|---|---|---|---|---|---|
| | | Ult. Stress (PSI × 10³) | S.D. | Modulus (PSI × 10⁶) | S.D. |
| Run 2AA* | 0.000421 | 513.71 | 12.86 | 13.59 | 0.55 |
| Run 3AA* | 0.00431 | 526.73 | 12.95 | 13.19 | 0.28 |
| Run 4AA* | 0.000421 | 518.68 | 23.00 | 13.32 | 0.20 |
| Control* | 0.000425 | 438.53 | 27.30 | 13.53 | 0.62 |
| Run 2AA** | | 266.5 | 36.0 | | |
| Run 3AA** | | 267.9 | 27.8 | | |
| Run 4AA** | | 290.1 | 3.6 | | |
| Control** | | 203.5 | 23.8 | | |

| Sample Description | Room Temp., After 96 Hr. Boil | | | | (Vs. Rm. Temp., Dry) | |
|---|---|---|---|---|---|---|
| | Ult. Stress (PSI × 10³) | S.D. | Modulus (PSI × 10⁶) | S.D. | Strength Retention (%) | Modulus Retention (%) |
| Run 2AA* | 248.30 | 10.72 | 13.01 | 0.15 | 48.33 | 95.75 |
| Run 3AA* | 246.07 | 18.05 | 12.86 | 0.10 | 46.72 | 97.45 |
| Run 4AA* | 258.81 | 24.31 | 13.02 | 0.13 | 49.90 | 97.78 |
| Control* | 153.86 | 15.32 | 12.69 | 0.22 | 35.09 | 93.02 |
| Run 2AA** | 209.3 | 13.6 | | | 78.54 | |
| Run 3AA** | 237.7 | 17.8 | | | 88.73 | |
| Run 4AA** | 241.5 | 34.7 | | | 83.25 | |
| Control** | 124.5 | 7.5 | | | 61.18 | |

| Sample Description | 180 Deg. F. After 96 Hr. Boil | | (Vs. Rm. Temp., Dry) |
|---|---|---|---|
| | Ult. Stress (PSI × 10³) | S.D. | Strength Retention (%) |
| Run 2AA* | 211.98 | 7.92 | 41.25 |
| Run 3AA* | 214.11 | 7.35 | 40.65 |

TABLE 4-continued

| | | | |
|---|---|---|---|
| Run 4AA* | 223.09 | 5.34 | 43.01 |
| Control* | 186.39 | 10.35 | 42.27 |
| Run 2AA** | 178.4 | 4.0 | 66.94 |
| Run 3AA** | 198.1 | 6.5 | 73.95 |
| Run 4AA** | 200.1 | 22.9 | 68.98 |
| Control** | 96.8 | 12.7 | 47.57 |

*Epoxy-Impregnated Strand
**Unidirectional Fiber Epoxy Laminate Properties Measured in Accordance with ASTM-D3039.

TABLE 5

| TYPICAL STRAND PROPERTY | Inventive Example w/ Size 4AA | S-2 GLASS® Size 1CC | Size 2CC |
|---|---|---|---|
| Catenary (in/50 ft) | 0 | 0.4 | 0.4 |
| Drape (in/50 ft) | 0 | 1.3 | 1.0 |
| Process Fuzz (g/750 yds.) | 0.001 | 0.003 | 0.003 |
| Yield (yd/lb.) | 735 | 735 | 733 |
| Tex | 675 | 675 | 677 |
| End Count | 1 | 10 | 10 |
| Solids (%) | 0.55 | 0.65 | 1.0 |
| Moisture (%) | 0.03 | 0.04 | 0.01 |
| Migration Streak (%) | 1 | 2 | 3 |
| Wetting Rate Epoxy 10 mv (sec) | 8 to 12 | 24 | 27 |
| Shear Strength (ksi) ASTM-D2344 | 11.5 | 9.6 | 9.8 |
| Hot-Wet Shear (ksi) ASTM-D2344 | 11.4 | 9.3 | 9.4 |
| Tensile Strength (ksi) ASTM-D2343 | 575 | 560 | 550 |
| Hot-Wet Tensile (ksi) ASTM-D2343 | 505 | 300 | 325 |
| Tensile Modulus (msi) ASTM-D2343 | 13.8 | 13.2 | 13.2 |
| Tensile Strain (%) ASTM-D2343 | 4.2 | 4.2 | 4.2 |
| TYPICAL FIBER PROPERTY | | | |
| Diameter ($\mu$m) ASTM-C162 | 14 | 10 | |
| Bulk Density (g/cc) ASTM-C693 | 2.450 | 2.488 | |
| Weight Loss (%) after: | | | |
| 1 wk @ 205° F., 10% HCl | 3.3 | 5.1 | |
| 1 wk @ 205° F., 20% $H_2SO_4$ | 3.6 | 5.7 | |
| Weibull Strength (ksi) | 730 | 665 | |
| TYPICAL COMPOSITE PROPERTY | | | |
| Hydraburst of 5.75 in OD Ring 0.07 inch thick (psi) | 6300 | 5700 | |
| Burst Strength Hoop Wrapped Aluminum 4500 psi service pressure (psi) | 12700–12800 | 11200–12600 | |

TABLE 6

| | | Size 1CC | Size 2CC |
|---|---|---|---|
| Ingredient | | | |
| Film-Former | AD501 DOW337 - Low Molecular Weight Epoxy Emulsion | 5.850 | |
| | AD503 DOW682 - High Molecular Weight Epoxy Emulsion | | 10.220 |
| Silane | A1100 (3-aminopropyltriethoxysilane) | 0.400 | |
| | Union Carbide A187 (gamma-glycidoxypropyltrimethoxysilane) | | 1.340 |
| | Methyl trimethoxy silane | 0.600 | |
| Acid | Glacial Acetic Acid | 0.200 | |
| Lubricants | Emery 6760 Polyethyleneimine Condensate | | 0.080 |
| | Emerlube 7440 | 0.76 | |
| | Polyvinyl pyrrolidone solution | 0.560 | 1.180 |
| | Demineralized water | 91.640 | 88.280 |

In another preferred embodiment, Size 5AA is prepared having the composition shown in Table 7 below. This size is applied to fibers which are prepared and formed into strands using apparatus as illustrated in the drawings. The size is applied in an amount of about 0.55% active solids based on the weight of the strand.

TABLE 7

Size 5AA

| Ingredient | % Active Solids | % by Weight as Received | Lbs./100 Gal. as Received |
|---|---|---|---|
| AD-502 | 53.8 | 7.13 | 59.464 |
| A-174 | 71 | 0.37 | 3.086 |
| A-187 | 71 | 0.37 | 3.086 |
| Aceteic acid | 100 | 0.04 | 0.334 |
| PEG 400MO | 100 | 0.92 | 7.673 |
| Emery 6760U | 50 | 0.21 | 1.751 |
| Monopentaerythritol | 100 | 0.11 | 0.917 |
| Citric acid | 100 | 0.031 | 0.258 |
| Deionized water | 100 | 91.739 | 765.103 |
| Total | | 100.00 | 834.00 |

Notes:
The mix solids are calculated to be 5.5% based on the as received solids.
Tolerance = +/− 5.0% of target weight above is acceptable for this formulation.

While the invention has been described in detail above in reference to preferred features and embodiments, various modifications will become readily apparent to the artisan. Thus, the invention is intended not to be limited by the foregoing detailed description, but to be defined by the appended claims and their equivalents.

What is claimed is:

1. An apparatus for forming high-temperature fusing batch material into fibers comprising:

a walled melting receptacle including: an open region in which the high-temperature fusing batch material is received; a melting region in which the batch material is melted to form molten material in flow communication with said open region; a chute in which flow of the molten material is regulated in flow communication with said melting region, the chute having a first wall, a second wall opposing the first wall, a third wall between said first wall and said second wall, and a fourth wall opposing said third wall, said walls together defining an upper chute portion and a lower chute portion with the lower chute portion having a cross-sectional area smaller than the cross-sectional area of the upper chute portion; and a discharge region from which the molten material is discharged in flow communication with the lower chute portion of said chute;

a heating element in the melting region for melting the batch material; and a baffle unit within the chute, said baffle unit defining a four-sided baffle area perpendicular to flow of the molten material and covering a substantial portion of the cross-sectional shape of the chute, said baffle area having openings defined therein, said baffle unit having one abutting side contacting said first wall of the chute, another abutting side contacting said second wall of the chute, one end facing said third wall of the chute with a gap therebetween, and another end facing said fourth wall of the chute with a gap therebetween, whereby said molten material can travel through the melting receptacle from the melting region to the discharge region while being partially impeded by the baffle unit.

2. An apparatus as defined in claim 1, wherein the baffle area is rectangular in shape.

3. An apparatus as defined in claim 2, wherein the baffle unit comprises two baffle plates connected together at a joint formed by a pair of inter-engaged slots, with each said baffle plate containing one said slot parallel to said third and fourth walls of said chute extending partially across the baffle plate.

4. An apparatus as defined in claim 3, wherein said openings in said baffle area comprise circular holes in each plate each having a diameter of from about 1 mm to about 12 mm.

5. An apparatus as defined in claim 4, wherein each of said baffle plates has a bend along an axis parallel to said third and fourth walls of the chute between the location where the baffle plates are joined and their respective ends farthest away from said joint.

6. An apparatus as defined in claim 5, wherein each said baffle plate is bent along said bend at an obtuse angle of from about 145 degrees to about 165 degrees.

7. An apparatus as defined in claim 6, wherein said baffle plates are mounted in the chute such that the ends of each said baffle plate are lower than the bend axis.

8. An apparatus as defined in claim 7, wherein said obtuse angle is from 143 degrees to 173 degrees.

* * * * *